United States Patent [19]

Onoda

[11] Patent Number: 5,053,613

[45] Date of Patent: Oct. 1, 1991

[54] IC CARD

[75] Inventor: Shigeo Onoda, Itami, Japan

[73] Assignee: Mitsubishi Denki Kabushiki Kaisha, Japan

[21] Appl. No.: 529,434

[22] Filed: May 29, 1990

[51] Int. Cl.⁵ .............................................. G06K 19/06
[52] U.S. Cl. .................................... 235/492; 235/487; 902/26; 361/395
[58] Field of Search ...................... 235/487, 488, 492; 902/26; 361/395, 399, 392

[56] References Cited

U.S. PATENT DOCUMENTS

| 3,684,817 | 8/1972 | Card, Jr. et al. | 174/52 R |
| 4,600,257 | 7/1986 | Fushimoto | 339/40 |
| 4,722,025 | 1/1988 | Robinson | 361/212 |
| 4,901,203 | 2/1990 | Kobayashi | 361/395 |
| 4,905,124 | 2/1990 | Banjo et al. | 361/395 |
| 4,924,076 | 5/1990 | Kitamura | 361/395 |

FOREIGN PATENT DOCUMENTS

| 0040753 | 4/1983 | European Pat. Off. . |
| 0317464 | 1/1990 | European Pat. Off. . |
| 2546859 | 4/1977 | Fed. Rep. of Germany . |
| 3008705 | 9/1981 | Fed. Rep. of Germany . |
| 3323604 | 1/1985 | Fed. Rep. of Germany . |

Primary Examiner—Harold Pitts
Attorney, Agent, or Firm—Leydig, Voit & Mayer

[57] ABSTRACT

An IC card has a card body with a plurality of slits extending through the thickness card body and a pair of metallic panels secured to the card body. The metallic panels have engaging portions which extend into the slits when the metallic panels are secured to the card body so that the engaging portions of both panels engage each other within respective slits to fasten both metallic panels to the card body. The electrical potentials of both metallic panels are equalized through these engaging portions.

13 Claims, 4 Drawing Sheets

IC CARD

BACKGROUND OF THE INVENTION

1. Field of the Invention

The present invention relates to a construction of an IC card panel.

2. Description of the Related Art

FIG. 1 is a perspective view of a conventional IC card, while FIG. 2 is a sectional view taken along the line II—II of FIG. 1. Referring to these Figures, the conventional IC card 10 has a card body 1 with metallic upper panel 2a and a metallic lower panel 2b secured to the upper or obverse side and lower or reverse side of the card body 1, respectively. The card body 1 has an electric circuit board 4 supported in a frame 5 at about the middle of the thickness of the card, the circuit board 4 having semiconductor memory devices 3 as electronic components mounted on both major surfaces thereof. Referring specifically to FIG. 2, the circuit board 4 is supported by supporting steps (not shown) formed in the inner surfaces of the frame 5 and fixed thereto by means of, for example, an adhesive.

The upper and lower panels 2a and 2b fit on the upper and lower sides of the frame 5 so as to protect the internal parts including the semiconductor memory devices 3. More specifically, recesses for receiving the panels are formed along the peripheral edges of the upper and lower sides of the frame 5, and the panels 2a, 2b are received in these recesses and fixed to the frame 5 by, for example, an adhesive. Thus, the panels are secured without protruding beyond the surfaces of the frame 5. A plurality of electrode terminals 6 for exchange of signals between the semiconductor memory devices 3 and external devices are provided on one end of the frame 5. The frame 5 further has a bore 5a which extends in the direction of breadth of the frame 5. A potential equalizing spring 7 is mounted in the bore 5a so as to contact the upper panel 2a at its one end and the lower panel 2b at its other end.

The construction of the panels of the known IC card will be described in more detail. Referring to FIG. 1, the upper panel 2a and the lower panel 2b are fixed to the frame 5 by suitable means such as double-sided adhesive sheets or an adhesive agent. In order that the internal devices such as the semiconductor memory devices 3 inside the card body 1 have improved durability against electrostatic charges, it is necessary to keep the panels 2a and 2b at the same electrical potential, i.e., to keep them electrically connected to each other. This can be accomplished by the potential equalizing spring 7 which is received in the bore 5a formed in the frame 5 as explained before.

In the known IC card having the described construction, the upper and lower panels 2a and 2b are bonded only at small bonding areas, so that problems such as separation of the panels are often experienced due to insufficient bonding strength. In addition, the number of parts is increased and the assembly process is complicated due to the use of the potential equalizing spring 7 for maintaining electrical conduction between both panels 2a and 2b.

SUMMARY OF THE INVENTION

Accordingly, an object of the present invention is to provide an IC card in which the strength of bonding of both panels to the frame is enhanced and the necessity for the potential equalizing spring for electrically connecting both panels is eliminated so as to reduce the number of parts and to facilitate assembly, thereby overcoming the above-described problems of the prior art.

To this end, according to one aspect of the present invention, there is provided an IC card comprising: a card body 1a having a predetermined thickness and accommodating at least one electronic component therein; an input/output portion provided on the card body signals between the electronic component and an external device; means defining a plurality of slits extending through the card body in the thickness direction of the card body; a pair of metallic panels covering respective sides of the card body so as to protect the card body and the electronic component; and connecting means including at least one electrically conductive engaging portion formed on one of the metallic panels and extending into the means defining slits when the metallic panels are secured to the card body, and at least one second engaging portion formed on the other of the metallic panels and extending into the means for defining slits so as to engage with the first engaging means within the means for defining slits such that the first and second engaging means retain each other.

Thus, in the IC card of the present invention, two panels are securely fixed to the frame as a result of engagement between a first engaging portion provided on one of the panels and a second engaging portion provided on the other panel, thus remarkably suppressing any tendency for these panels to come off the frame. By forming the first and second engaging portions from conductive materials, it is possible to maintain both panels in an electrically connected state and, hence, at the same electrical potential.

These and other objects, features and advantages of the present invention will become clear from the following description of the preferred embodiment when the same is read in conjunction with the accompanying drawings.

DESCRIPTION OF THE PREFERRED EMBODIMENT

A preferred embodiment of the present invention will be described with reference to the drawings.

Figure 1:
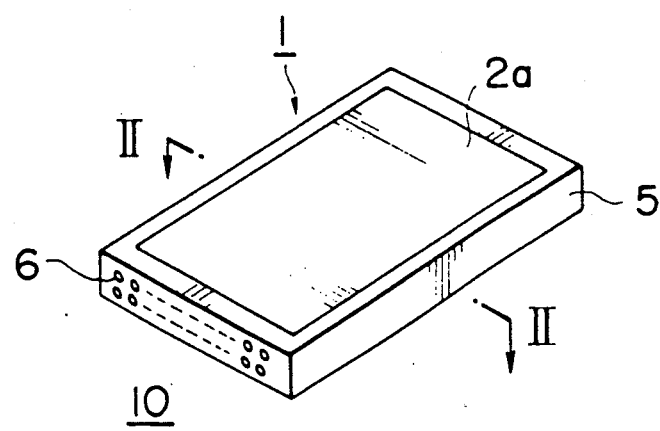
FIG. 1 is a perspective view of a conventional IC card.
Figure 2:
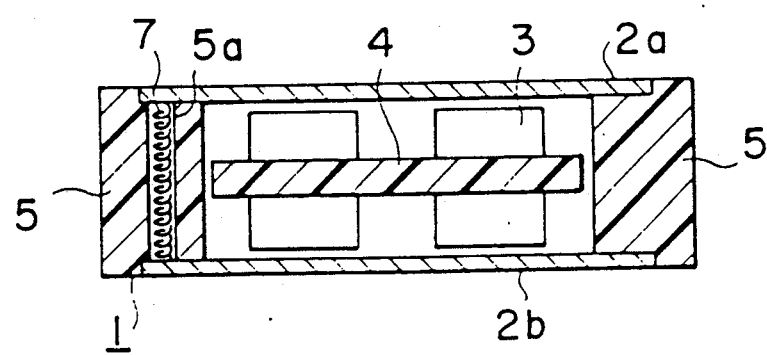
FIG. 2 is a sectional view taken along the line II—II of FIG. 1.
Figure 3:
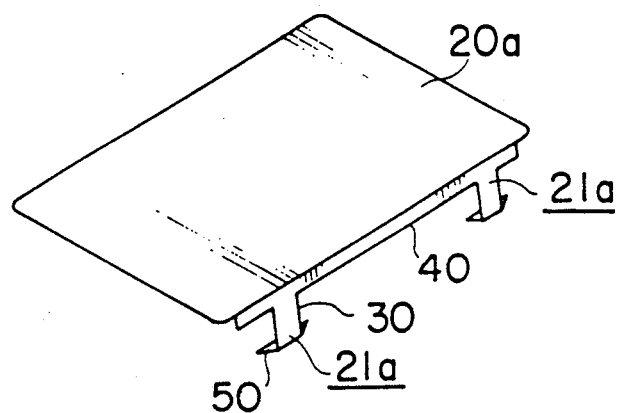
FIG. 3 is a perspective view of an upper panel used in an embodiment of the IC card of the present invention.

Referring to FIG. 3 which is a perspective view of an upper panel used in the IC card embodying the present invention. The upper panel 20a made of a metal is provided with a pair of first engaging portions 21a formed on each longitudinal edge thereof. Each engaging portion includes a tab 30 projecting from the main part of the panel 20a and claws 50 which orthogonally project from both sides of the end of the tab 30 and extend obliquely inwardly of the IC card. These claws exhibit resiliency as they are bent slightly inwardly as explained above. In order to ensure sufficiently high mechanical strength of the engaging portions 21a, it is possible to provide the panel 20a with reinforcement portions 40 along both longitudinal edges of the panel 20a.

Figure 4:
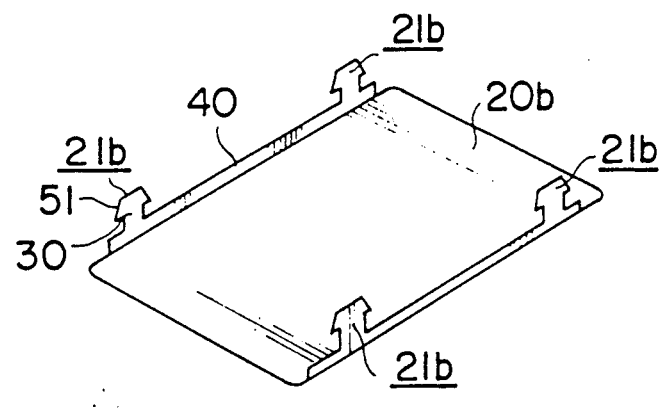
FIG. 4 is a perspective view of a lower panel used in the embodiment.

FIG. 4 is a perspective view of a lower panel used in the IC card embodying the present invention. The lower panel 20b is provided with a pair of second engaging portions 21b formed on each longitudinal edge thereof. Each second engaging portion 21b has a tab 30 projecting from the main part of the lower panel 20b and retainers projecting orthogonally from both sides of the end of the tab 30. The lower panel 20b also can have reinforcement portions 40 to strengthen the second engaging portions as in the case of the upper panel shown in FIG. 3. The first engaging portions 21a and the reinforcement portions 40 of the upper panel 20a may be formed integrally with the main part of the upper panel by bending from a single sheet. Similarly, the second engaging portions 21b and the reinforcement portions 40 of the lower panel 20a may be formed integrally with the main part of the lower panel by bending from a single sheet.

The first engaging portions 21a and the second engaging portions 21b are made of an electrically conductive material or materials.

Figure 5:
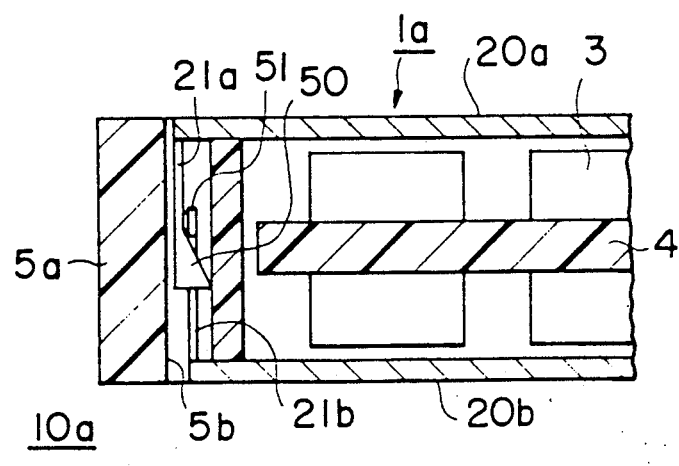
FIG. 5 is a perspective view of the embodiment of the IC card incorporating the panels shown in FIGS. 3 and 4.

FIG. 5 is a sectional view of the embodiment of the IC card of the invention incorporating the upper panel 20a and the lower panel 20b shown in FIGS. 3 and 4. Unlike the conventional IC card, the illustrated embodiment of the IC card of the present invention has slits 5b which receive the first engaging portions 21a of the upper panel 20a and the second engaging portions 21b of the lower panel 20b with these engaging portions 21a and 21b engaging each other within each slit. The slits 5b are formed in the portions of the frame 5 corresponding to the first and second engaging portions 21a, 21b and the reinforcement portions 40 of both panels 20a and 20b.

Figure 6A:
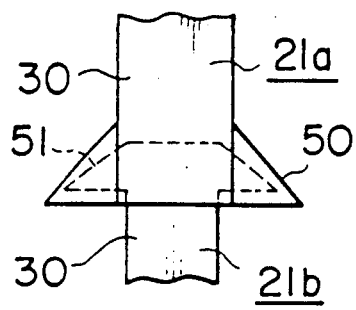
FIGS. 6A and 6B are a front elevational view and a plan view of the IC card shown in FIG. 5 in a state before the engaging portions of both panels are brought into engagement with each other.
Figure 6B:
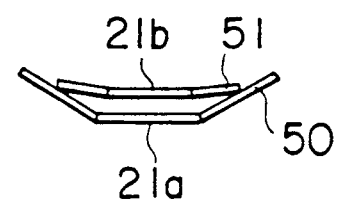
Figure 7A:
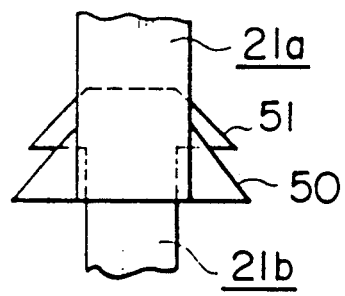
FIGS. 7A and 7B are a front elevational view and a plan view of the IC card shown in FIG. 5 in which the engaging portions of both panels have been brought into engagement with each other.
Figure 7B:
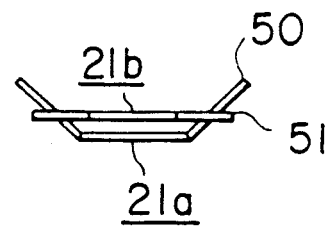

A description will be given of a process for assembly of the IC card with the upper and lower panels having the described constructions. As the first step, the lower panel 20b is fixed to the frame 5b by means of, for example, an adhesive (not shown). In this state, the second engaging portions 21b and the reinforcement portions 40, if provided, are received in the slits 5b formed in the frame 5a. Subsequently, the upper panel 20a is fitted to the frame 5a such that the first engaging portions 21a are aligned with the slits 5b. The upper panel 20a maybe fixed to the frame 5a in this state. FIGS. 6A and 6B show the IC card in the state before the first engaging portions 21a on the upper panel 20a and the second engaging portions 21b of the lower panel 20b are brought into engagement, in front elevation and in plan, respectively. Subsequently, the claws 50 of the first engaging portions 21a on the upper panel 20a and the retainers 51 on the second engaging portions 21b of the lower panel 20b engage each other, whereby corresponding first and second engaging portions 21a and 21b resiliently engage with each other, as shown in FIGS. 7A and 7B.

In the illustrated embodiment, each claw 50 on the upper panel 20a is tapered so that the claws 50 and the retainers 51 can securely engage each other regardless of any dimensional fluctuation in the engaging portions 21a and 21b, since such fluctuation can be absorbed by a change in the position where the tapered claws 50 engage the associated retainers 51, whereby the engagement between corresponding engaging portions can be attained with a higher degree of freedom. The taper for enhancing the degree of freedom, however, may be provided on the retainers 51 on the lower panel 20b instead of the claws 50 on the upper panel 20a. In such a case, the direction of the taper is reverse to that illustrated in FIGS. 6A to 7A. The provision of the taper, however, is not essential and may be omitted.

It will also be clear that there is no significant distinction between the upper and lower panels 20a and 20b. Namely, the arrangement may be such that the first engaging portions with claws are provided on the lower panel 20b, while the second engaging portions with the retainers are provided on the upper panel 20a. It is also possible to provide the resilient claws both on the upper and lower panels.

In the illustrated embodiment, the engagement between the first and second engaging portions is attained by the anchoring effect produced between the claws and the retainers which anchor each other at their contacting edges. This, however, is only illustrative and the engaging portions can have any desired form provided that they can securely hold each other.

Figure 8A:
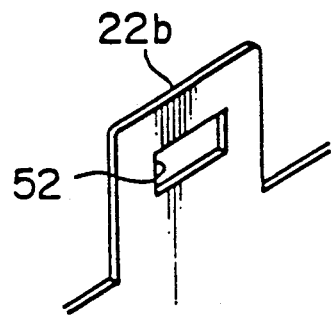
FIGS. 8(a) and 8(b) are perspective views of a modification of the engaging portions provided on both panels in the IC card of the invention.
Figure 8B:
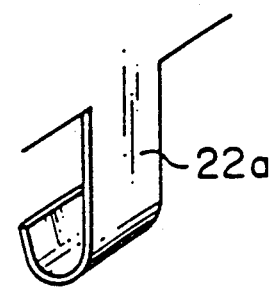
Figure 9A:
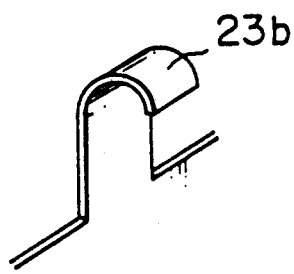
FIGS. 9(a) and 9(b) are perspective views of another modification of the engaging portions provided on the panels in the IC card of the present invention.
Figure 9B:
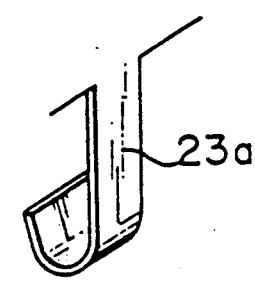

For instance, as shown in FIGS. 8(a) and 8(b), the first and second engaging portions maybe formed by a resilient U-shaped hook portion 22a provided on one of the panels and a tab portion 22b formed on the other panel and having a slit 52 which can retain the U-shaped hook portion 22a. As shown in FIGS. 9(a) and 9(b), it is also possible to arrange the engaging portions of both panels as U-shaped resilient hook portions 23a, 23a which retain each other.

As has been described, in the IC card of the present invention, both panels are securely held on the frame by virtue of the mutual engagement between the engaging portions provided on both panels, whereby the tendency for the panels to come off the frame is greatly suppressed. In addition, electrical connection between both panels is accomplished through the engaging portions on both panels, thus eliminating any necessity for a specific part for equalizing the potentials of both panels, whereby the number of parts is reduced and assembly is facilitated greatly.

What is claimed is:

1. An IC card comprising:
 a card body having a predetermined thickness and accommodating at least one electronic component therein;
 an input/output portion provided on said card body for exchanging signals between said electronic components and an external device;
 means defining a plurality of slits extending through the thickness of said card body;

a pair of metallic panels respectively covering opposite sides of said card body to protect said card body and said electronic component; and connecting means including at least one electrically conductive engaging portion formed on one of said metallic panels and extending into said means defining slits when said metallic panels are secured to said card body, and at least one second engaging portion formed on the other of said metallic panels and extending into said means defining slits to engage said first engaging means within said slits such that said first and second engaging means contact and retain each other.

2. An IC card according to claim 1 wherein said card body includes an electric circuit board having two opposed surfaces, at least one electronic component mounted on at least one of said surfaces of said circuit board, and a frame having a thickness greater than the thickness of said circuit board, said frame surrounding said circuit board and supporting said circuit board such that said circuit board is about in the middle of the thickness of said card body, wherein said pair of metallic panels are secured to said frame to cover and protect said surfaces of said circuit board, said means defining slits includes at least one slit formed in said frame at opposite sides of said circuit board and extending through the thickness of said frame, and said connecting means includes said first and second engaging portions formed on said metallic panels at positions respectively corresponding to said slits.

3. An IC card according to claim 1 wherein said first engaging portion includes a tab projecting from one of said metallic panels including at least one claw formed on said tab and said second engaging portion includes a tab projecting from the other of said metallic panels and including at least one retainer formed on said tab for retaining said claw of said first engaging means.

4. An IC card according to claim 3 wherein said second engaging portion includes a tab projecting from the other of said metallic panels and a pair of retainers extending substantially orthogonally from said tab and said first engaging portion includes a tab projecting from one of said metallic panels and further includes a pair of resilient claws projecting substantially orthogonally from the end of said tab, said claws being retained by said retainers.

5. An IC card according to claim 4 wherein either one of said claws of said first engaging portion and said retainers of said second engaging portion are tapered such that one of said claws and said retainers converge to absorb any dimensional fluctuation of said first and second engaging portions.

6. An IC card according to claim 2 wherein said second engaging portion includes a tab projecting from the other of said metallic panels and a pair of resilient claws substantially orthogonally projecting from said tab and said first engaging portion includes a tab projecting from said one of said metallic panels and a pair of resilient claws projecting substantially orthogonally from said tab, said claws of said first and second engaging portions being retained by each other.

7. An IC card according to claim 6 wherein either one of said claws of said first engaging portion and said claws of said second engaging portion are tapered such that one said claws and said retainers converge to absorb any dimensional fluctuation of said first and second engaging portions.

8. An IC card according to claim 2 wherein said first engaging portion includes a resilient U-shaped hook portion and said second engaging portion includes a tab having a slit for retaining said U-shaped hook portion.

9. An IC card according to claim 2 wherein said first engaging portion includes a resilient U-shaped hook portion bent in a U-like form, and said second engaging portion includes a U-shaped hook portion bent in a U-like form to engage with said U-shaped hook portion of said first engaging means.

10. An IC card according to claim 2 wherein said first and second engaging portions provide a conductive path for equalizing the electrical potentials of said metallic panels.

11. An IC card according to claim 2 wherein said first and second engaging portions are formed integrally with the respective metallic panels.

12. An IC card according to claim 2 comprising reinforcement portions projecting from said metallic panels adjacent said first and second engaging portions, respectively.

13. An IC card according to claim 2 comprising bonding mans for bonding at least one of said metallic panels to said frame.

* * * * *